(12) United States Patent
Cho et al.

(10) Patent No.: US 10,854,389 B2
(45) Date of Patent: *Dec. 1, 2020

(54) ELECTRONIC COMPONENT

(71) Applicant: SAMSUNG ELECTRO-MECHANICS CO., LTD., Suwon-si (KR)

(72) Inventors: Beom Joon Cho, Suwon-si (KR); Woo Chul Shin, Suwon-si (KR); Ki Young Kim, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,042

(22) Filed: Mar. 17, 2020

(65) Prior Publication Data

US 2020/0219654 A1 Jul. 9, 2020

Related U.S. Application Data

(63) Continuation of application No. 16/279,101, filed on Feb. 19, 2019, now Pat. No. 10,636,571, which is a (Continued)

(30) Foreign Application Priority Data

Aug. 29, 2018 (KR) .................. 10-2018-0101969

(51) Int. Cl.
*H01G 4/232* (2006.01)
*H01G 4/38* (2006.01)
(Continued)

(52) U.S. Cl.
CPC ............ *H01G 4/232* (2013.01); *H01G 2/06* (2013.01); *H01G 4/38* (2013.01); *H01G 4/12* (2013.01); *H01G 4/30* (2013.01)

(58) Field of Classification Search
CPC ........... H01G 2/06; H01G 4/38; H01G 4/232; H01G 4/242
See application file for complete search history.

(56) References Cited

U.S. PATENT DOCUMENTS 6,191,933 B1 * 2/2001 Ishigaki ................. H01G 4/232
361/309
6,512,632 B2  1/2003 Yamamoto
(Continued)

FOREIGN PATENT DOCUMENTS

JP   H07-249541 A   9/1995
JP   2004-273935 A  9/2004

OTHER PUBLICATIONS

U.S. Notice of Allowance dated Feb. 19, 2019 issued in U.S. Appl. No. 16/279,101.
(Continued)

*Primary Examiner* — Eric W Thomas
(74) *Attorney, Agent, or Firm* — Morgan, Lewis & Bockius LLP

(57) ABSTRACT

An electronic component includes a capacitor array including a plurality of multilayer capacitors; and first and second metal frames disposed on a side surface and another side surface of the capacitor array and electrically connected to first and second external electrodes, respectively, wherein the first metal frame includes a first support portion; a first mounting portion; and a first connection portion, the second metal frame includes a second support portion; a second mounting portion; and a second connection portion, and lengths of the first and second mounting portions in the first
(Continued)

direction are smaller than a length of the capacitor array in the first direction.

11 Claims, 11 Drawing Sheets

Related U.S. Application Data continuation of application No. 16/170,645, filed on Oct. 25, 2018, now Pat. No. 10,636,570.

(51) Int. Cl.
*H01G 2/06* (2006.01)
*H01G 4/30* (2006.01)
*H01G 4/12* (2006.01)

(56) References Cited

U.S. PATENT DOCUMENTS

| | | |
|---|---|---|
| 9,911,535 B2 | 3/2018 | Mori et al. |
| 2002/0048142 A1 | 4/2002 | Moriwaki et al. |
| 2005/0041367 A1 | 2/2005 | Yoshii et al. |
| 2015/0131202 A1 | 5/2015 | Masuda et al. |

OTHER PUBLICATIONS

U.S. Final Office Action dated Sep. 30, 2019 issued in U.S. Appl. No. 16/279,101.
U.S. Non-Final Office Action dated Apr. 15, 2019 issued in U.S. Appl. No. 16/279,101.

* cited by examiner

ELECTRONIC COMPONENT

CROSS-REFERENCE TO RELATED APPLICATION(S)

This application is a continuation of U.S. patent application Ser. No. 16/279,101, filed on Feb. 19, 2019, which is a continuation of U.S. patent application Ser. No. 16/170,645, filed on Oct. 25, 2018, which claims the benefit of priority to Korean Patent Application No. 10-2018-0101969 filed on Aug. 29, 2018 in the Korean Intellectual Property Office, the disclosures of which are incorporated herein by reference in their entireties.

TECHNICAL FIELD

The present disclosure relates to an electronic component.

BACKGROUND

Multilayer capacitors are commonly used in a variety of electronic devices due to being able to be implemented with a small size and high capacity.

In recent years, due to the rapid rise in popularity of environmentally-friendly automobiles and electric vehicles, power driving systems in automobiles have increased, and accordingly, demand for the multilayer capacitors required for automobiles has also increased.

Since a high level of thermal reliability, electrical reliability, and mechanical reliability are required in use as an automotive part, the level of performance required for the multilayer capacitor is also being advanced.

In particular, there is an increasing demand for a modular electronic device having high resistance to vibrations and deformation, while allowing high capacity to be implemented by stacking a plurality of multilayer capacitors in a limited space.

Meanwhile, modular electronic components are being manufactured to be elongated. Therefore, when a modular electronic component is mounted on a substrate, a position of a metal frame is distorted and the metal frame may contact land patterns having different polarities, which may result in a short circuit defect.

SUMMARY

An aspect of the present disclosure may provide an electronic component capable of implementing high capacity, improving durability and reliability against vibration and deformation, and preventing a short circuit when being mounted on a substrate even though it is manufactured in a modular type.

According to an aspect of the present disclosure, an electronic component may include a capacitor array including a plurality of multilayer capacitors which are sequentially arranged in a first direction; a first metal frame disposed on one side surface of the capacitor array and electrically connected to first external electrodes of the plurality of multilayer capacitors; and a second metal frame disposed on another side surface of the capacitor array and electrically connected to second external electrodes of the plurality of multilayer capacitors, wherein the first metal frame includes a first support portion bonded to first head portions of the first external electrodes; a first mounting portion extending in a second direction perpendicular to the first direction from a lower end of the first support portion; and a first connection portion extending in the second direction from an upper end of the first support portion and bonded to first band portions of the first external electrodes, the second metal frame includes a second support portion bonded to second head portions of the second external electrodes; a second mounting portion extending in the second direction from a lower end of the second support portion; and a second connection portion extending in the second direction from an upper end of the second support portion and bonded to second band portions of the second external electrodes, and lengths of the first and second mounting portions in the first direction are smaller than a length of the capacitor array in the first direction.

Lengths of the first and second support portions in the first direction maybe smaller than the length of the capacitor array in the first direction.

A first cutout portion may be provided at one corner of the first mounting portion and the first support portion in the first direction, and a second cutout portion may be provided at a corner of the second mounting portion and the second support portion in the first direction facing the first cutout portion in a diagonal direction.

First cutout portions may be provided at opposite corners of the first mounting portion and the first support portion in the first direction, respectively, and second cutout portions may be provided at opposite corners of the second mounting portion and the second support portion in the first direction, respectively.

At least one third cutout portion may be disposed at a middle region of a corner edge between the first mounting portion and the first support portion in the first direction, such that the first mounting portion and the first support portion are divided into multiple pieces having a predetermined gap therebetween. At least one fourth cutout portion may be disposed at a middle region of a corner edge between the second mounting portion and the second support portion in the first direction, such that the second mounting portion and the second support portion are divided into multiple pieces having a predetermined gap therebetween.

$0.4 \leq b/a < 1.0$ may be satisfied in which the length of the capacitor array in the first direction is a and the length of the first or second mounting portion in the first direction is b.

A conductive adhesive portion may be each disposed between the first external electrodes, and the first support portion and the first connection portion, and the conductive adhesive portion may be each disposed between the second external electrodes, and the second support portion and the second connection portion.

The multilayer capacitor may include a body, and the first and second external electrodes formed on opposite end surfaces of the body in a second direction, and the body may include a dielectric layer, and first and second internal electrodes alternately disposed while having the dielectric layer interposed therebetween.

The first and second external electrodes may include the first and second head portions formed on the opposite end surfaces of the body in the second direction; and first and second band portions extending from the first and second head portions to portions of upper and lower surfaces of the body and to portions of opposing side surfaces of the body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
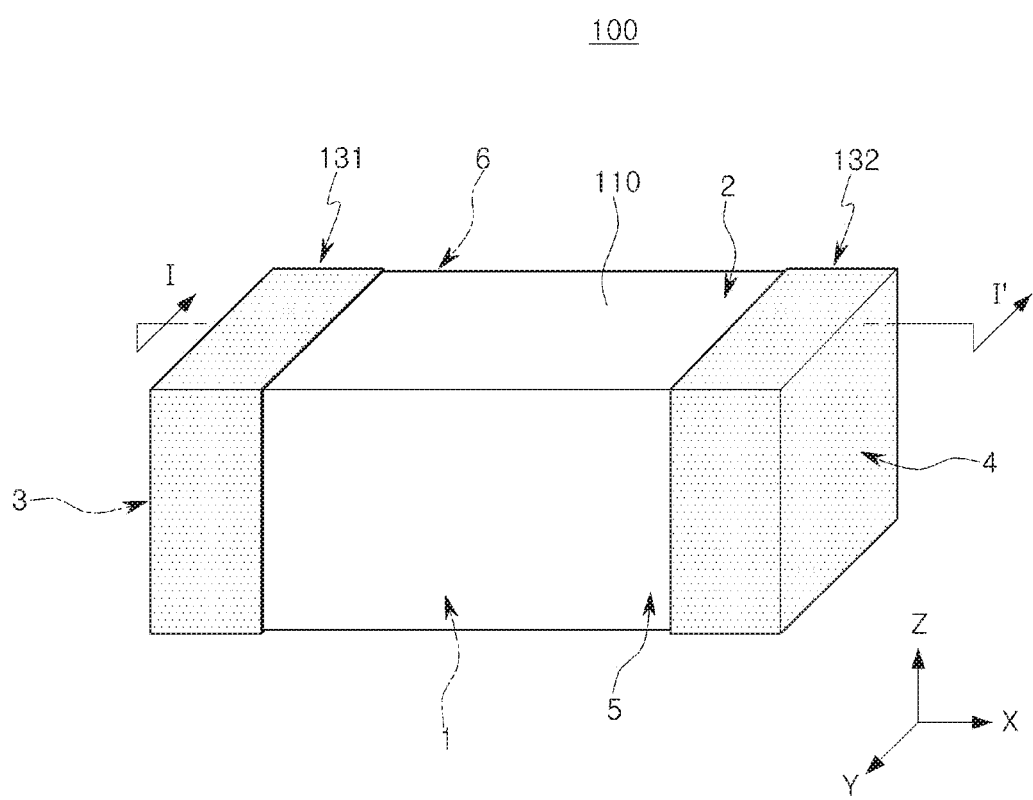
FIG. 1 is a perspective view schematically illustrating a multilayer capacitor applied to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor, respectively.

In addition, X, Y, and Z refer to a width direction, length direction, and a thickness direction of a capacitor array, respectively.

Here, the Y direction refers to a stacked direction in which dielectric layers are stacked in the present exemplary embodiment.

Figure 2A:
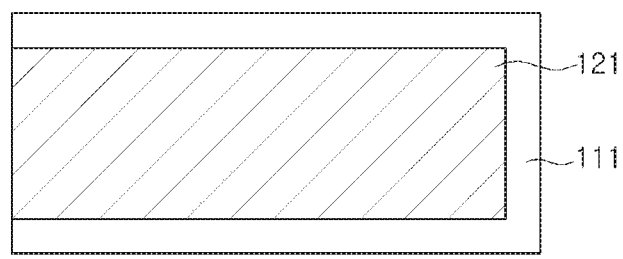
FIGS. 2A and 2B are plan views illustrating first and second internal electrodes applied to the multilayer capacitor of FIG. 1.
Figure 2B:
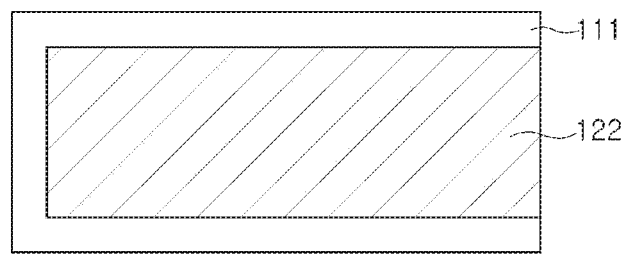
Figure 3:
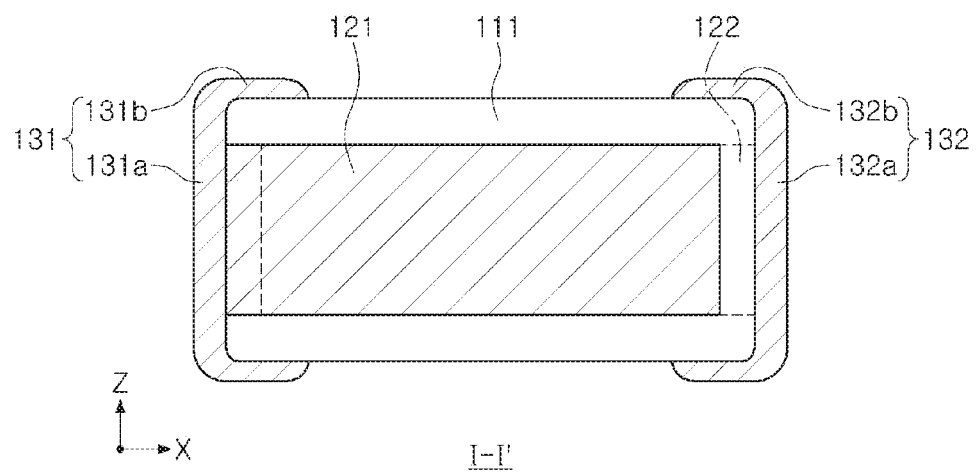
FIG. 3 is a cross-sectional view taken along a line I-I' of FIG. 1.

FIG. 1 is a perspective view schematically illustrating a multilayer capacitor applied to an exemplary embodiment in the present disclosure, FIGS. 2A and 2B are plan views illustrating first and second internal electrodes applied to the multilayer capacitor of FIG. 1, and FIG. 3 is a cross-sectional view taken along a line I-I' of FIG. 1.

First, a structure of a multilayer capacitor applied to an electronic component according to the present exemplary embodiment will be described with reference to FIGS. 1 through 3.

Referring to FIGS. 1 through 3, a multilayer capacitor 100 according to the present exemplary embodiment may include a body 110, and first and second external electrodes 131 and 132 formed on opposite end surfaces of the body 110, respectively, in an X direction of the body 110.

The body 110 may be formed by stacking a plurality of dielectric layers 111 in a Y direction of the body 110 and then sintering the plurality of dielectric layers 111. The dielectric layers 111 adjacent to each other of the body 110 of the capacitor may be integrated with each other so that boundaries therebetween are not readily apparent without using a scanning electron microscope (SEM).

In addition, the body 110 may include the plurality of dielectric layers 111, and first and second internal electrodes 121 and 122 alternately disposed in a Y direction of the body 110 while having the dielectric layers 111 interposed therebetween and having different polarities.

In addition, the body 110 may include an active region, which is a portion contributing to formation of capacitance of the capacitor, and cover regions provided on left and right portions of the active region in the Y direction of the body 110 and upper and lower portions of the active region in a Z direction of the body 110 as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a $BaTiO_3$ based ceramic powder or the like.

An example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which Ca, Zr, or the like, is partially dissolved in $BaTiO_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

The first and second internal electrodes 121 and 122, which are electrodes to which different polarities are applied, may be formed on the dielectric layer 111 to be stacked in the Y direction of the body 110, and may be alternately disposed in the body 110 so as to opposite to each other along the Y direction of the body 110 while having one dielectric layer 111 interposed therebetween.

At this time, the first and second internal electrodes 121 and 122 may be electrically insulated from each other by the dielectric layer 111 disposed therebetween.

Meanwhile, the present disclosure illustrates and describes a structure in which the internal electrodes are staked in the Y direction of the body 110, but the present disclosure is not limited thereto and may also be applied to a structure in which the internal electrodes are stacked in the Z direction of the body, if necessary.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 131 and 132 disposed on the opposite end surfaces of the body 110 in the X direction of the body 110, respectively, to be described below.

According to the configuration as described above, when a predetermined voltage is applied to the first and second external electrodes 131 and 132, electric charges may be accumulated between the first and second internal electrodes 121 and 122.

At this time, a capacitance of the multilayer capacitor 100 may be in proportional to an overlapping area of the first and second internal electrodes 121 and 122 overlapping with each other along the Y direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd—Ag) alloy, or the like, nickel (Ni), and copper (Cu).

At this time, a method of printing the conductive paste may be a screen printing method, a gravure printing method, or the like, but is not limited thereto.

Voltages having different polarities may be provided to the first and second external electrodes 131 and 132, and the first and second external electrodes 131 and 132 may be disposed on the opposite end surfaces of the body 110 in the X direction of the body 110, and may be electrically connected to the exposed portions of the first and second internal electrodes 121 and 122, respectively.

The first external electrode 131 may include a first head portion 131a and a first band portion 131b.

The first head portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 131 to each other.

The first band portion 131b may be a portion extending from the first head portion 131a to portions of the first, second, fifth, and sixth surfaces 1, 2, 5, and 6 of the body 110 to improve fixing strength.

The second external electrode 132 may include a second head portion 132a and a second band portion 132b.

The second head portion 132a may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 132 to each other.

The second band portion 132b may be a portion extending from the second head portion 132a to portions of the first, second, fifth, and sixth surfaces 1, 2, 5, and 6 of the body 110 to improve fixing strength.

Meanwhile, the first and second external electrodes 131 and 132 may further include a plating layer.

The plating layer may include first and second nickel (Ni) plating layers, and first and second tin (Sn) plating layers covering the first and second Ni plating layers, respectively.

Figure 4:
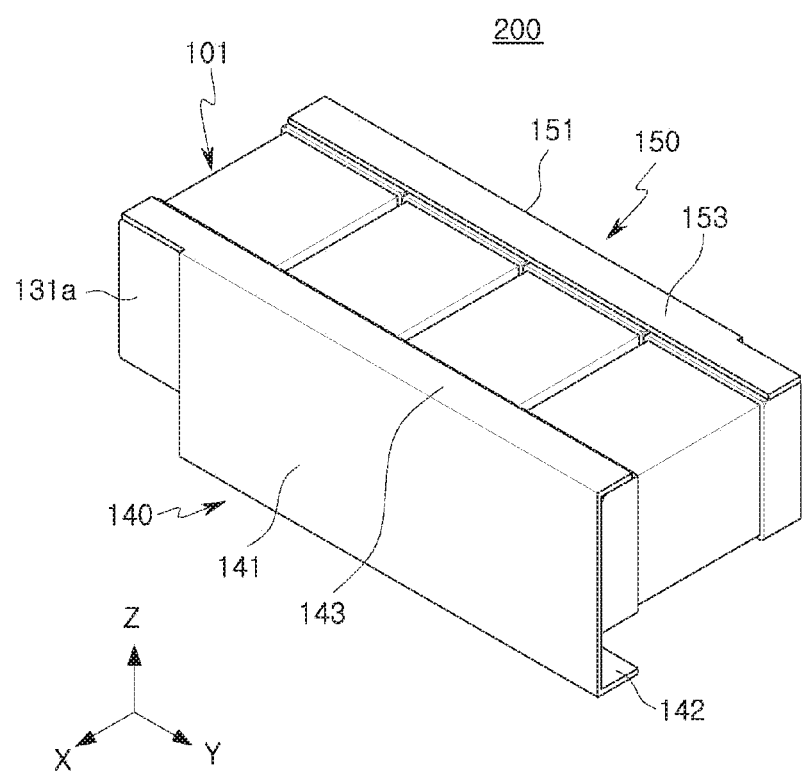
FIG. 4 is a perspective view illustrating a schematic structure of an electronic component according to an exemplary embodiment in the present disclosure.
Figure 5:
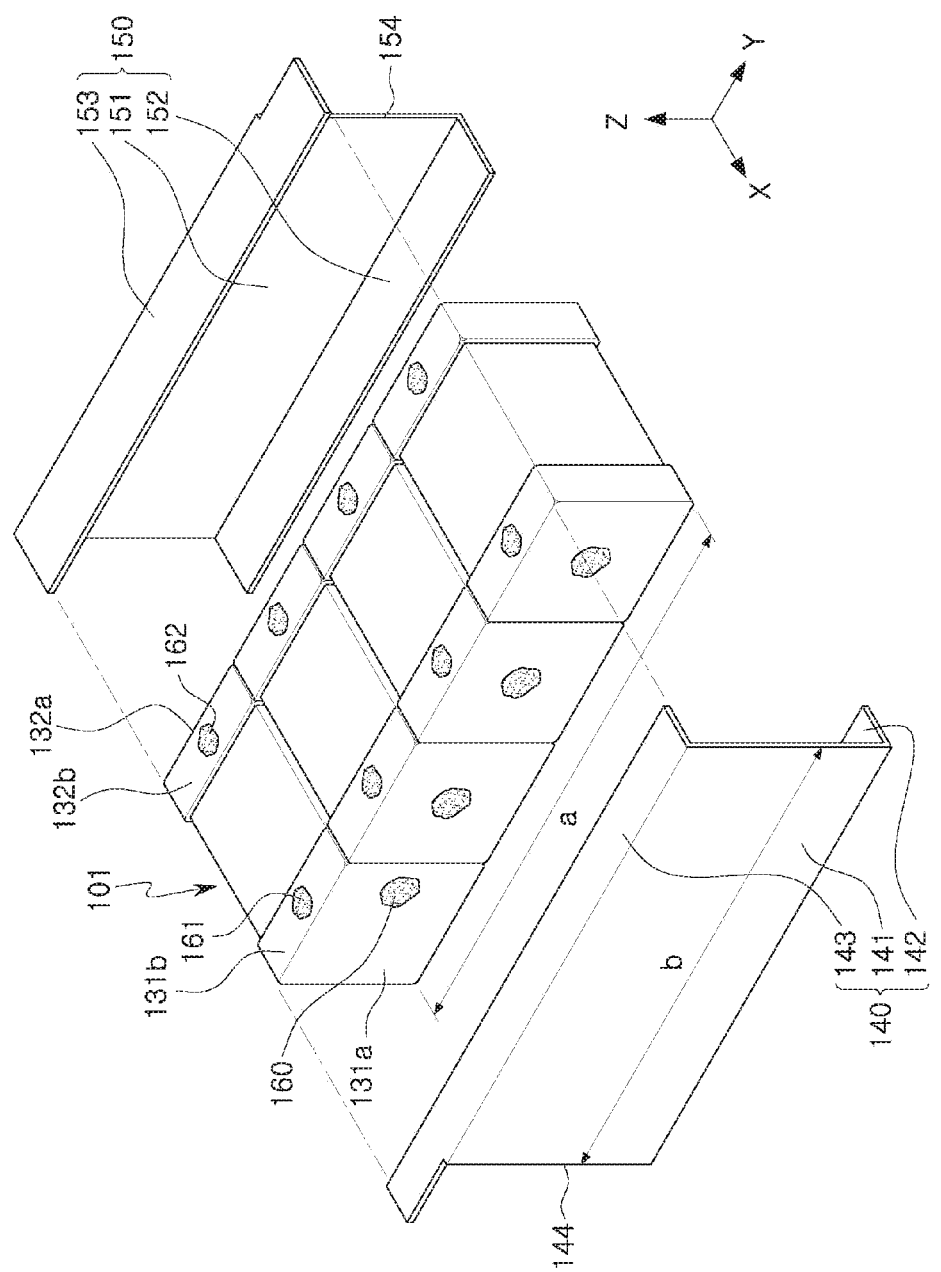
FIG. 5 is an exploded perspective view of the electronic component of FIG. 4.

FIG. 4 is a perspective view illustrating a schematic structure of an electronic component according to an exemplary embodiment in the present disclosure and FIG. 5 is an exploded perspective view of the electronic component of FIG. 4.

Referring to FIGS. 4 and 5, an electronic component 200 according to the present exemplary embodiment may include a capacitor array 101 including a plurality of multilayer capacitors 100 which are sequentially arranged in the Y direction, which is the first direction, a first metal frame 140 disposed on one side surface of the capacitor array 101 in an X direction thereof and connected to the first external electrode 131 of each of the plurality of multilayer capacitors 100, and a second metal frame 150 disposed on the other side surface of the capacitor array 101 in the X direction thereof and connected to the second external electrode 132 of each of the plurality of multilayer capacitors 100.

The first metal frame 140 may be bonded to the respective first external electrodes 131 of the plurality of multilayer capacitors 100 to serve as a common electrode connecting the first external electrodes 131 adjacent to each other to each other.

Such a first metal frame 140 may include a first support portion, a first mounting portion 142, and a first connection portion 143.

The first support portion 141 may be a portion which is perpendicular to a mounting surface, is elongated in the Y direction, and is bonded to the respective first head portions 131a of the plurality of first external electrodes 131, and may electrically and physically connect the first head portions 131a of the plurality of first external electrodes 131 to each other.

At this time, a length of the first support portion 141 in the Y direction may be smaller than a length of the capacitor array 101 in the Y direction. To this end, a first cutout portion 144 may be provided at one corner of the first support portion 141 in the Y direction.

At this time, a conductive adhesive portion 160 may be disposed between the first external electrodes 131 and the first support portion 141.

According to the present exemplary embodiment, the conductive adhesive portion 160 may be disposed in the respective first head portions 131a of the first external electrodes 131.

Such a conductive adhesive portion 160 may be formed of a high temperature solder, a conductive adhesive material, or the like, but is not limited thereto.

The first mounting portion 142 may be a portion extending in the X direction, which is the second direction, perpendicular to the Y direction, which is the first direction, from a lower end of the first support portion 141 and formed to be horizontal with respect to the mounting surface, and may serve as a connection terminal at the time of mounting the substrate.

In addition, the first mounting portion 142 may be disposed to be spaced apart from a lower surface of the multilayer capacitor 100 by a predetermined distance in the Z direction.

At this time, a length of the first mounting portion 142 in the Y direction may be smaller than the length of the capacitor array 101 in the Y direction.

To this end, the first cutout portion 144 may be provided at one corner of the first mounting portion 142 in the Y direction.

That is, the first cutout portion 144 may be provided at a portion connecting the first support portion 141 and one corner of the first mounting portion 142 to each other.

The first connection portion 143 may extend in the X direction from an upper end of the first support portion 141 and be formed horizontally with respect to the mounting surface, maybe bonded to the respective first band portions 131b of the plurality of first external electrodes 131, and may electrically and physically connect the first band portions 131b of the plurality of first external electrodes 131 to each other.

At this time, a conductive adhesive portion 161 may be further disposed between the first external electrodes 131 and the first connection portion 143.

According to the present exemplary embodiment, the conductive adhesive portion 161 may be disposed in upper sides of the respective first band portions 131b of the first external electrodes 131.

Such a conductive adhesive portion 161 may be formed of a high temperature solder, a conductive adhesive material, or the like, but is not limited thereto.

The second metal frame 150 may be bonded to the respective second external electrodes 132 of the plurality of multilayer capacitors 100 to serve as a common electrode connecting the second external electrodes 132 adjacent to each other to each other.

Such a second metal frame 150 may include a second support portion 151, a second mounting portion 152, and a second connection portion 153.

The second support portion 151 may be a portion which is perpendicular to a mounting surface, is elongated in the Y direction, and is bonded to the respective second head portions 132a of the plurality of second external electrodes 132, and may electrically and physically connect the second head portions 132a of the plurality of second external electrodes 132 to each other.

At this time, a length of the second support portion 151 in the Y direction may be smaller than the length of the capacitor array 101 in the Y direction.

To this end, a second cutout portion 154 may be provided at one corner of the second support portion 151 in the Y direction.

The second cutout portion 154 may be provided at a corner of the second support portion 151 facing the first cutout portion 144 in a diagonal direction.

At this time, a conductive adhesive portion 160 may be disposed between the second external electrodes 132 and the second support portion 151.

According to the present exemplary embodiment, the conductive adhesive portion 160 may be disposed in the second head portions 132a of the second external electrodes 132.

Such a conductive adhesive portion 160 may be formed of a high temperature solder, a conductive adhesive material, or the like, but is not limited thereto.

The second mounting portion 152 may be a portion extending in the X direction, which is the second direction, perpendicular to the Y direction, which is the first direction, from a lower end of the second support portion 151 and formed to be horizontal with respect to the mounting surface, and may serve as a connection terminal at the time of mounting the substrate.

In addition, the second mounting portion 152 may be disposed to be spaced apart from a lower surface of the multilayer capacitor 100 by a predetermined distance in the Z direction.

At this time, a length of the second mounting portion 152 in the Y direction may be smaller than the length of the capacitor array 101 in the Y direction.

To this end, the second cutout portion 154 may be provided at one corner of the second mounting portion 152 in the Y direction.

The second cutout portion 154 may be provided at a corner of the second mounting portion 152 facing the first cutout portion 144 in a diagonal direction.

That is, the second cutout portion 154 may be provided at a portion connecting the second support portion 151 and one corner of the second mounting portion 152 to each other.

The second connection portion 153 may extend in the X direction from an upper end of the second support portion 151 and be formed horizontally with respect to the mounting surface, maybe bonded to the respective first band portions 132b of the plurality of second external electrodes 132, and may electrically and physically connect the first band portions 131b of the plurality of first external electrodes 131 to each other.

The second connection portion 153 may extend in the X direction from an upper end of the second support portion 151 and be formed horizontally with respect to the mounting surface, may be bonded to the respective second band portions 132b of the plurality of second external electrodes 132, and may electrically and physically connect the second band portions 132b of the plurality of second external electrodes 132 to each other.

At this time, a conductive adhesive portion 162 may be further disposed between the second external electrodes 132 and the second connection portion 153.

According to the present exemplary embodiment, the conductive adhesive portion 162 may be disposed in upper sides of the respective first band portions 132b of the second external electrodes 132.

Such a conductive adhesive portion 162 may be formed of a high temperature solder, a conductive adhesive material, or the like, but is not limited thereto.

A multilayer capacitor according to the related art has a structure in which a capacitor body and a substrate are in direct contact with each other by a solder when being mounted on the substrate. Here, since heat or mechanical deformation generated in the substrate is directly transferred to the multilayer capacitor, it is difficult to secure a high level of reliability.

In the electronic component 200 according to the present exemplary embodiment, since the plurality of multilayer capacitors 100 are formed of an integrated capacitor array 101, a high capacitance maybe implemented, and thermal reliability and mechanical reliability of the electronic component 200 may be improved by preventing stress from the substrate from being directly transferred to the respective multilayer capacitors 100 when the electronic component 200 is mounted on the substrate by bonding the first and second metal frames 140 and 150 to the opposing side surfaces of the capacitor array 101 to secure an interval between the capacitor array 101 and the substrate.

Meanwhile, in the case of a modular electronic component including the capacitor array, when a position and a direction of the modular electronic component at the time of mounting the modular electronic component on the substrate are deviated from regular position and direction on the design, an end portion of the metal frame is in contact with land patterns having different polarities due to an extended length of the metal frame, which tends to result in a short circuit defect.

In the electronic component 200 according to the present exemplary embodiment, the first and second mounting portions 142 and 152 of the first and second metal frames 140 and 150 maybe shorter than the capacitor array. Therefore, even though the first and second metal frames 140 and 150 are distorted at a predetermined angle when the electronic component 200 is mounted on the substrate, a short circuit defect caused at the time of mounting the electronic component 200 on the substrate may be prevented by preventing the first or second mounting portion 142 or 152 from not being in contact with the land patterns having different polarities.

Meanwhile, in a case in which the lengths of the first and second mounting portions 142 and 152 are excessively short, since bonded areas between the first and second mounting portions 142 and 152 and the land patterns of the substrate are relatively reduced, fixing strength may be lowered.

Therefore, according to the present exemplary embodiment, the lengths of the first and second cutout portions 144 and 154 are limited so that a predetermined level of fixing strength may be secured.

Figure 11:
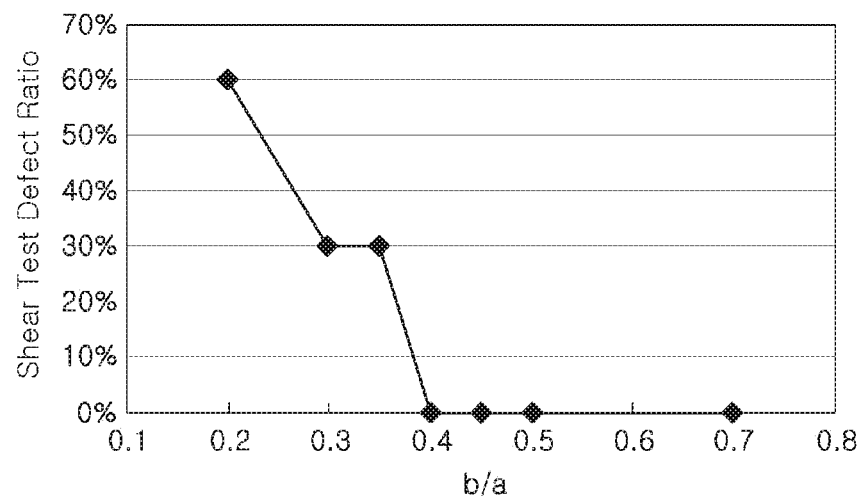
FIG. 11 is a graph illustrating a result of a shear test according to a ratio of a length of the mounting portion to a length of a capacity array.

FIG. 11 is a graph illustrating a result of a shear test according to a ratio of a length of the mounting portion to a length of a capacity array.

Here, "a" denotes a length of the capacity array 101 in the Y direction, and "b" denotes a length of the first mounting portion 142 or the first support portion 141.

In the shear test, ten electronic component with b/a of 0.2 to 0.7 were mounted on the PCB, and a force of 20 N was then applied at a speed of 1 mm/min for 10 seconds to evaluate whether or not the components were detached.

Referring to FIG. 11, in a case in which b/a is 0.35 or less, the area of the mounting portion is too small, so that the fixing strength by the solder may not be sufficiently secured, and it may be seen that defective results are obtained as a result of the shear test.

Therefore, the range of b/a in which the fixing strength may be sufficiently secured may be 0.4=b/a<1.0.

Figure 6:
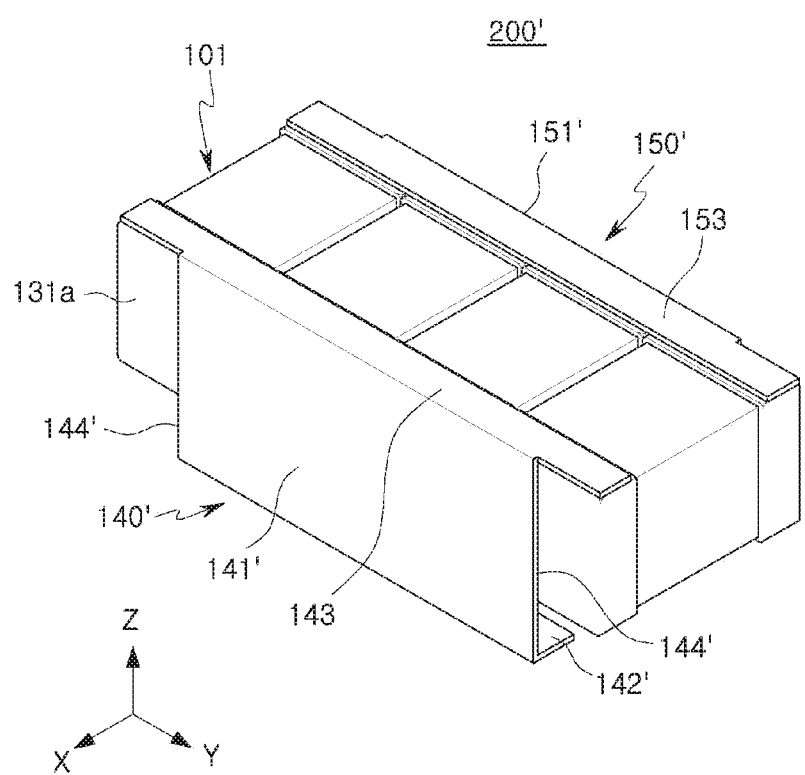
FIG. 6 is a perspective view illustrating a schematic structure of an electronic component according to another exemplary embodiment in the present disclosure.
Figure 7:
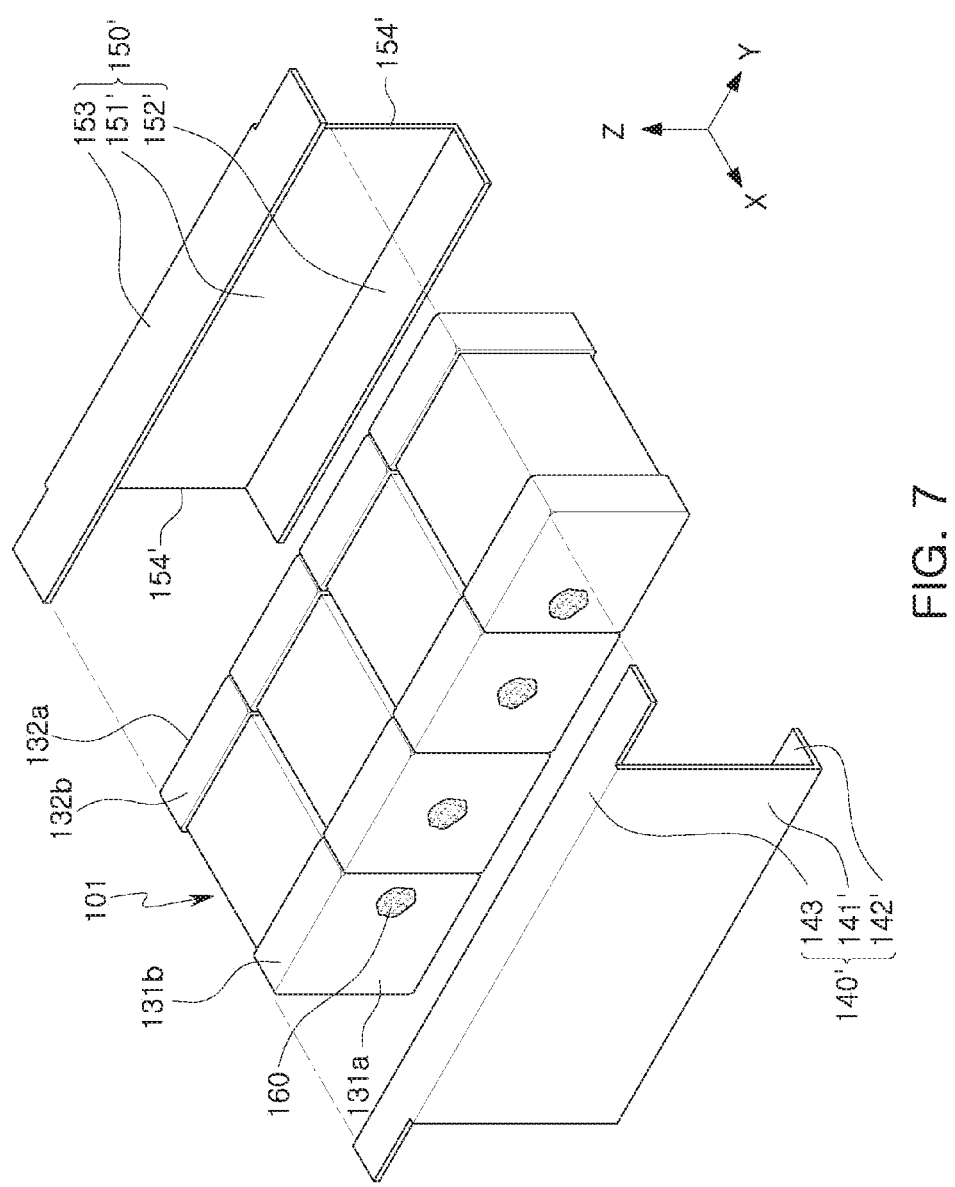
FIG. 7 is an exploded perspective view of the electronic component of FIG. 6.

FIG. 6 is a perspective view illustrating a schematic structure of an electronic component according to another exemplary embodiment in the present disclosure and FIG. 7 is an exploded perspective view of the electronic component of FIG. 6.

Here, since the structure of the multilayer capacitor is similar to that of the above-described exemplary embodiment, a detailed description thereof will be omitted in order to avoid duplication, and the first and second metal frames having a structure different from the above-described exemplary embodiment will be described in detail.

Referring to FIGS. 6 and 7, a first metal frame 140' of an electronic component 200' according to the present exemplary embodiment may have first cutout portions 144' provided at opposite corners of a first mounting portion 142' and a first support portion 141' in the Y direction, respectively.

In addition, a second metal frame 150' may have second cutout portions 154' provided at opposite corners of a second mounting portion 152' and a second support portion 151' in the Y direction.

Therefore, according to the present exemplary embodiment, since the total area of the mounting portion and the support portion is smaller than that of the above-described exemplary embodiment, the fixing strength of the metal frames is weakened. However, an effect of preventing the short circuit defect may be further improved in a case in which the electronic component is distorted when being mounted on the substrate.

Figure 8A:
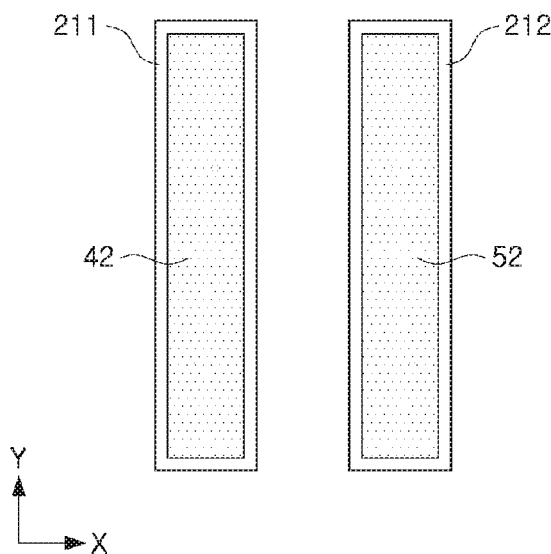
FIGS. 8A and 8B are plan views illustrating a state in which a mounting portion is bonded to a land pattern of a substrate without being distorted and a state in which the mounting portion is bonded to the land pattern of the substrate while being distorted at a predetermined angle in the conventional electronic component, respectively.
Figure 8B:
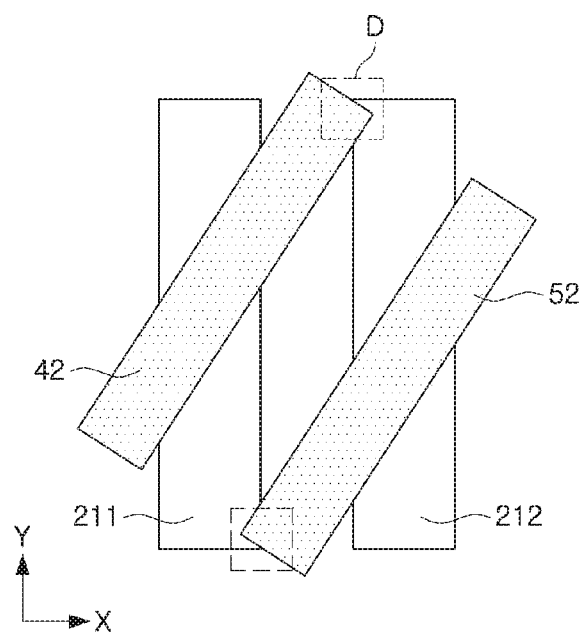

FIGS. 8A and 8B are plan views illustrating a state in which a mounting portion is bonded to a land pattern of a substrate without being distorted and a state in which the mounting portion is bonded to the land pattern of the substrate while being distorted at a predetermined angle in an electronic component including the conventional mounting portion of a rectangular shape without having the cutout portion, respectively.

Referring to FIG. 8A, in a case in which first and second mounting portions 42 and 52 are mounted and bonded onto first and second land patterns 211 and 212 without being distorted, the short circuit problem does not occur. However, as illustrated in FIG. 8B, in a case in which the first and second mounting portions 42 and 52 are unintendedly bonded to the first and second land patterns 211 and 212 while being distorted at a predetermined angle when the electronic component is mounted on the substrate, an end of the first mounting portion 42 is in contact with a portion of the second land pattern 212 and an end of the second mounting portion 52 is in contact with a portion of the first land pattern 211. As a result, the short circuit defect D may occur.

Figure 9A:
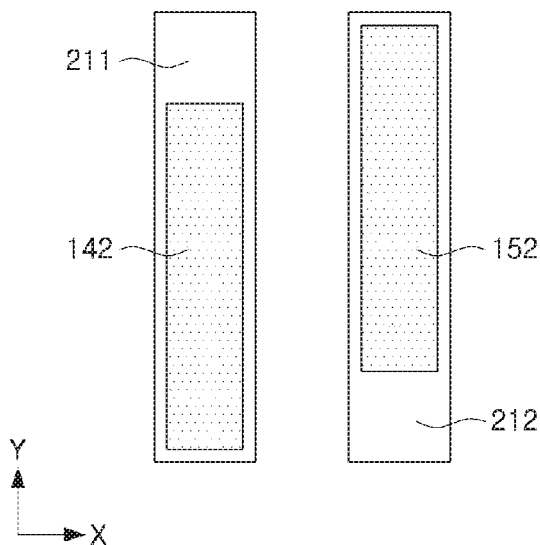
FIGS. 9A and 9B are plan views illustrating a state in which a mounting portion is bonded to a land pattern of a substrate without being distorted and a state in which the mounting portion is bonded to the land pattern of the substrate while being distorted at a predetermined angle in an electronic component including the mounting portion of FIG. 4, respectively.
Figure 9B:
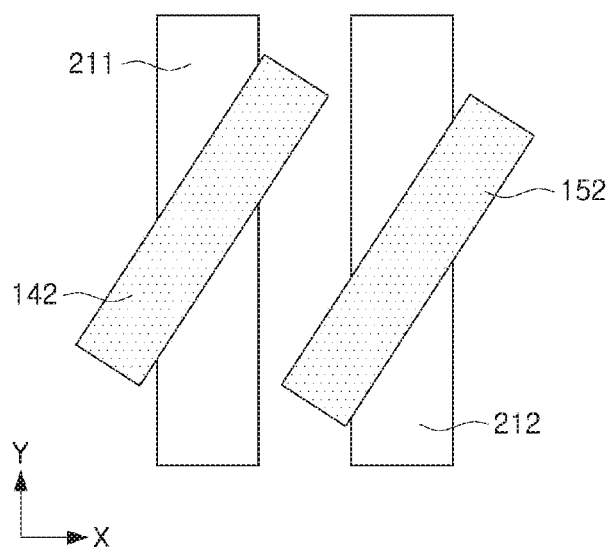

FIGS. 9A and 9B are plan views illustrating a state in which a mounting portion is bonded to a land pattern of a substrate without being distorted and a state in which the mounting portion is bonded to the land pattern of the substrate while being distorted at a predetermined angle in an electronic component including the mounting portion of FIG. 4, respectively.

Referring to FIG. 9A, in a case in which the first and second mounting portions 142 and 152 are mounted and bonded onto the first and second land patterns 211 and 212 without being distorted, the short circuit problem does not occur. As illustrated in FIG. 9B, even though the first and second mounting portions 142 and 152 are bonded to the first and second land patterns 211 and 212 while being distorted at a predetermined angle, the length of the first mounting portion 142 is reduced by the first cutout portion 144, such that an end of the first mounting portion 142 may not be in contact with the second land pattern 212, and the length of the second mounting portion 152 is reduced by the second cutout portion 154, such that an end of the second mounting portion 152 may not be in contact with the first land pattern 211. As a result, the short circuit defect may be avoided.

Figure 10A:
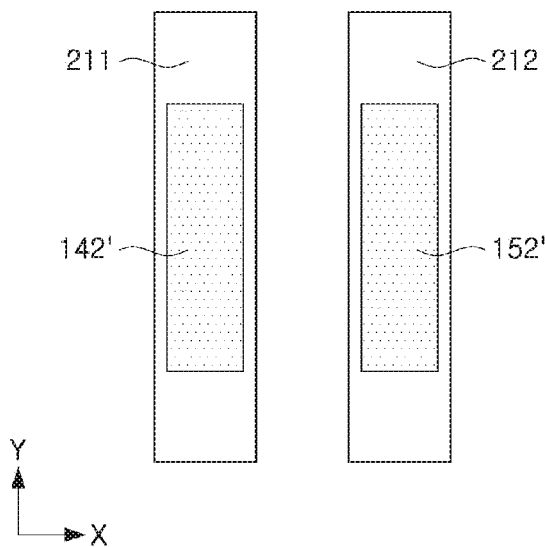
FIGS. 10A and 10B are plan views illustrating a state in which a mounting portion is bonded to a land pattern of a substrate without being distorted and a state in which the mounting portion is bonded to the land pattern of the substrate while being distorted at a predetermined angle in an electronic component including the mounting portion of FIG. 6, respectively.
Figure 10B:
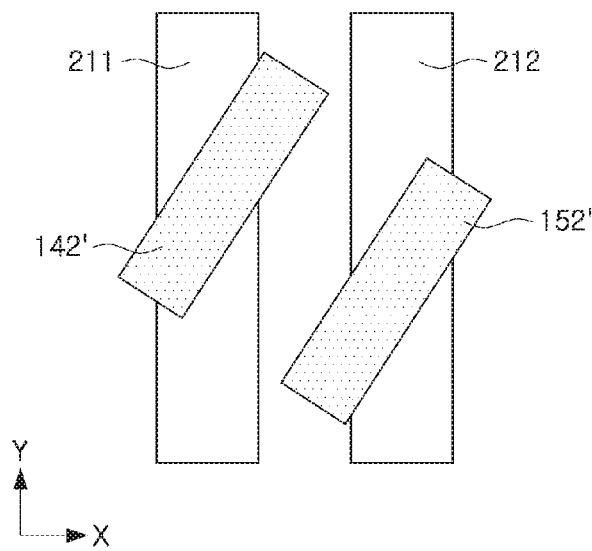

FIGS. 10A and 10B are plan views illustrating a state in which a mounting portion is bonded to a land pattern of a substrate without being distorted and a state in which the mounting portion is bonded to the land pattern of the substrate while being distorted at a predetermined angle in an electronic component including the mounting portion of FIG. 6, respectively.

Referring to FIG. 10A, in a case in which the first and second mounting portions 142' and 152' are mounted and bonded onto the first and second land patterns 211 and 212 without being distorted, the short circuit problem does not occur. As illustrated in FIG. 10B, even though the first and second mounting portions 142' and 152' are bonded to the first and second land patterns 211 and 212 while being distorted at a predetermined angle, the length of the first mounting portion 142' is reduced by the first cutout portion 144', such that an end of the first mounting portion 142' may not be in contact with the second land pattern 212, and the length of the second mounting portion 152' is reduced by the second cutout portion 154', such that an end of the second mounting portion 152' may not be in contact with the first land pattern 211. As a result, the short circuit defect may be avoided.

Figure 12:
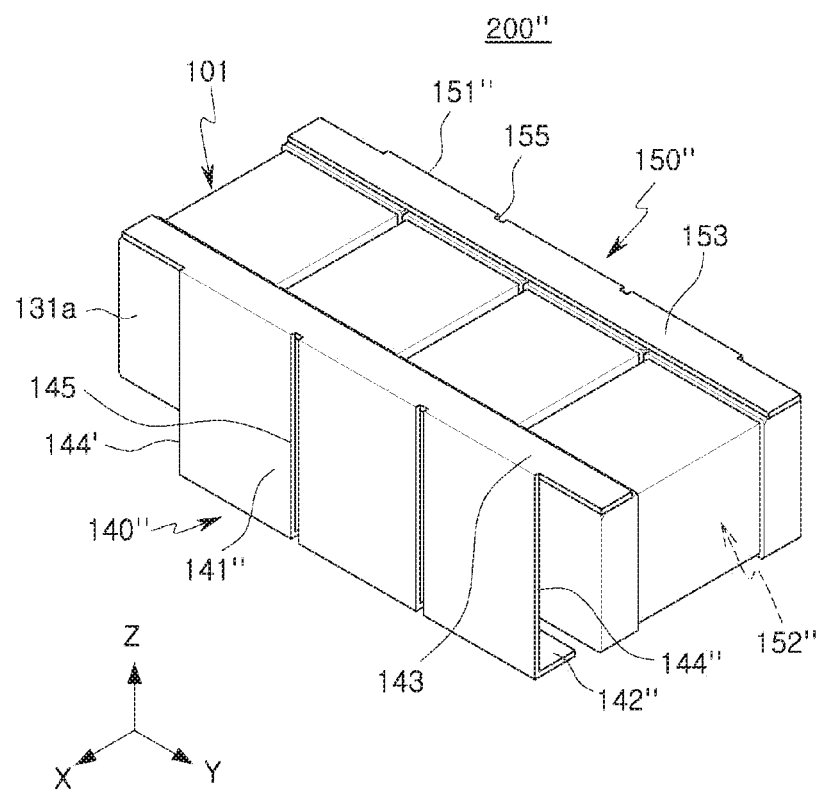
FIG. 12 is a perspective view illustrating a schematic structure of an electronic component according to still another exemplary embodiment in the present disclosure.

FIG. 12 is a perspective view illustrating a schematic structure of an electronic component 200" according to still another exemplary embodiment in the present disclosure.

Here, since the structure of the multilayer capacitor 200" is similar to that of the above-described exemplary embodiment 200 or 200', a detailed description thereof will be omitted in order to avoid duplication, and the first and second metal frames having a structure different from the above-described exemplary embodiment will be described in detail.

Referring to FIG. 12, in addition to first cutout portions 144', a first metal frame 140" of the electronic component 200" may have at least one third cutout portion 145 disposed at a middle region of a corner edge between the first mounting portion 142" and the first support portion 141" in the Y direction, such that the first mounting portion 142" and the first support portion 141" are divided into multiple pieces having a predetermined gap therebetween.

Likewise, a second metal frame 150" of the electronic component 200" may have at least one fourth cutout portion 155 disposed at a middle region of a corner edge between the second mounting portion 152" and the second support portion 151" in the Y direction, such that the second mounting portion 152" and the second support portion 151" are divided into multiple pieces having a predetermined gap therebetween.

As set forth above, according to the exemplary embodiment in the present disclosure, the high capacity electronic component which is manufactured in the modular type, may be provided, the durability and reliability against vibration and deformation of the electronic component may be improved, and even though the position of the metal frame is distorted when the electronic component is mounted on the substrate, the short circuit may be prevented.

While exemplary embodiments have been shown and described above, it will be apparent to those skilled in the art that modifications and variations could be made without departing from the scope of the present invention as defined by the appended claims.

What is claimed is:

1. An electronic component comprising:
a capacitor array including a plurality of multilayer capacitors which are sequentially arranged in a first direction;
a first metal frame disposed on one side surface of the capacitor array and electrically connected to first external electrodes of the plurality of multilayer capacitors; and
a second metal frame disposed on another side surface of the capacitor array and electrically connected to second external electrodes of the plurality of multilayer capacitors,
wherein the first metal frame includes a first support portion bonded to first head portions of the first external electrodes; a first mounting portion extending in a second direction perpendicular to the first direction from a lower end of the first support portion; and a first connection portion extending in the second direction from an upper end of the first support portion and bonded to first band portions of the first external electrodes,
the second metal frame includes a second support portion bonded to second head portions of the second external electrodes; a second mounting portion extending in the second direction from a lower end of the second support portion; and a second connection portion extending in the second direction from an upper end of the second support portion and bonded to second band portions of the second external electrodes,
each multilayer capacitor of the plurality of multilayer capacitors includes a body and the first and second external electrodes disposed on opposite end surfaces of the body in the second direction, and the body includes a dielectric layer, and first and second internal electrodes alternately disposed while having the dielectric layer interposed therebetween, and
lengths of the first and second support portions in the first direction are smaller than a length of the capacitor array in the first direction.

2. The electronic component of claim 1, wherein lengths of the first and second mounting portions in the first direction are smaller than the length of the capacitor array in the first direction.

3. The electronic component of claim 1, wherein a first cutout portion is provided at one corner of the first mounting portion and the first support portion in the first direction, and
a second cutout portion is provided at a corner of the second mounting portion and the second support portion in the first direction facing the first cutout portion in a diagonal direction.

4. The electronic component of claim 1, wherein first cutout portions are provided at opposite corners of the first mounting portion and the first support portion in the first direction, respectively, and
second cutout portions are provided at opposite corners of the second mounting portion and the second support portion in the first direction, respectively.

5. The electronic component of claim 4, wherein at least one third cutout portion is disposed at a middle region of a corner edge between the first mounting portion and the first support portion in the first direction, such that the first mounting portion and the first support portion are divided into multiple pieces having a predetermined gap therebetween, and
at least one fourth cutout portion is disposed at a middle region of a corner edge between the second mounting portion and the second support portion in the first direction, such that the second mounting portion and the second support portion are divided into multiple pieces having a predetermined gap therebetween.

6. The electronic component of claim 1, wherein $0.4 \leq b/a < 1.0$ in which dimension "a" is the length of the capacitor array in the first direction and dimension b is a length of the first or second mounting portion in the first direction.

7. The electronic component of claim 1, wherein a conductive adhesive portion is disposed between the first external electrodes and the first support portion, and between the first external electrodes and the first connection portion, and the conductive adhesive portion is disposed between the second external electrodes and the second support portion, and between the second external electrodes and the second connection portion.

8. The electronic component of claim 1, wherein the first and second external electrodes respectively include the first and second head portions disposed on the opposite end surfaces of the body in the second direction; and the first and second band portions extending from the first and second head portions to portions of upper and lower surfaces of the body and to portions of opposing side surfaces of the body.

9. The electronic component of claim 1, wherein each of the first and second mounting portions is spaced apart from a lower surface of the capacitor array by a predetermined distance in a mounting direction of the electronic component which is orthogonal to the first and second directions.

10. An electronic component comprising:

a capacitor array including a plurality of multilayer capacitors which are sequentially arranged in a first direction;

a first metal frame disposed on one side surface of the capacitor array and electrically connected to first external electrodes of the plurality of multilayer capacitors; and a second metal frame disposed on another side surface of the capacitor array and electrically connected to second external electrodes of the plurality of multilayer capacitors, wherein the first metal frame includes a first support portion bonded to first head portions of the first external electrodes; a first mounting portion extending in a second direction perpendicular to the first direction from a lower end of the first support portion; and a first connection portion extending in the second direction from an upper end of the first support portion and bonded to first band portions of the first external electrodes, the second metal frame includes a second support portion bonded to second head portions of the second external electrodes; a second mounting portion extending in the second direction from a lower end of the second support portion; and a second connection portion extending in the second direction from an upper end of the second support portion and bonded to second band portions of the second external electrodes, each multilayer capacitor of the plurality of multilayer capacitors includes a body and the first and second external electrodes disposed on opposite end surfaces of the body in the second direction, and the body includes a dielectric layer, and first and second internal electrodes alternately disposed while having the dielectric layer interposed therebetween, and $0.4 \leq b/a < 1.0$ in which dimension "a" is the length of the capacitor array in the first direction and dimension b is a length of the first or second mounting portion in the first direction.

11. An electronic component comprising:

a capacitor array including a plurality of multilayer capacitors which are sequentially arranged in a first direction;

a first metal frame disposed on one side surface of the capacitor array and electrically connected to first external electrodes of the plurality of multilayer capacitors; and a second metal frame disposed on another side surface of the capacitor array and electrically connected to second external electrodes of the plurality of multilayer capacitors, wherein the first metal frame includes a first support portion bonded to first head portions of the first external electrodes; a first mounting portion extending in a second direction perpendicular to the first direction from a lower end of the first support portion; and a first connection portion extending in the second direction from an upper end of the first support portion and bonded to first band portions of the first external electrodes, the second metal frame includes a second support portion bonded to second head portions of the second external electrodes; a second mounting portion extending in the second direction from a lower end of the second support portion; and a second connection portion extending in the second direction from an upper end of the second support portion and bonded to second band portions of the second external electrodes, each multilayer capacitor of the plurality of multilayer capacitors includes a body and the first and second external electrodes disposed on opposite end surfaces of the body in the second direction, and the body includes a dielectric layer, and first and second internal electrodes alternately disposed while having the dielectric layer interposed therebetween, a conductive adhesive portion is disposed between the first external electrodes and the first support portion, and between the first external electrodes and the first connection portion, and the conductive adhesive portion is disposed between the second external electrodes and the second support portion, and between the second external electrodes and the second connection portion.

* * * * *